(12) United States Patent
Johansson et al.

(10) Patent No.: US 7,369,562 B2
(45) Date of Patent: May 6, 2008

(54) METHOD AND APPARATUS FOR FORWARDING OF TELECOMMUNICATIONS TRAFFIC

(75) Inventors: Johan Johansson, San Diego, CA (US); Lars-Orjan Kling, Södertalje (SE); Ake Lindholm, Tullinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 959 days.

(21) Appl. No.: 10/433,122

(22) PCT Filed: Nov. 29, 2000

(86) PCT No.: PCT/SE00/02370

§ 371 (c)(1),
(2), (4) Date: Sep. 22, 2003

(87) PCT Pub. No.: WO02/45359

PCT Pub. Date: Jun. 6, 2002

(65) Prior Publication Data

US 2004/0062251 A1    Apr. 1, 2004

(51) Int. Cl.
*H04L 12/56* (2006.01)
(52) U.S. Cl. ........................ 370/401; 370/428
(58) Field of Classification Search ............... 370/351, 370/401, 389, 390, 404, 405, 392, 400, 338, 370/395, 397, 393, 428; 711/141
See application file for complete search history.

(56) References Cited

U.S. PATENT DOCUMENTS 5,293,488 A * 3/1994 Riley et al. ................. 709/244
5,509,123 A   4/1996 Dobbins et al.

(Continued)

FOREIGN PATENT DOCUMENTS

EP     0 530 397 A1    3/1993

(Continued)

OTHER PUBLICATIONS

Chan et al; "A Framework for Optimizing the Cost and Performance of Next-Generation IP Routers"; IEEE Journal on Selected Areas in Communications, vol. 17, No. 6, Jun. 1999, pp. 1013-1029.

(Continued)

*Primary Examiner*—Kwang Bin Yao
*Assistant Examiner*—Syed Bokhari
(74) *Attorney, Agent, or Firm*—Nixon & Vanderhye P.C.

(57) ABSTRACT

The present invention relates to a telecommunications node (1a) that is able to handle IP-traffic and to terminate telecommunications traffic, which node includes means for simple and effective load distribution between resources (40-43) in the node. The inventive telecommunications node (1a) includes board internal IP-subnets (45, 46) with associated subnet interfaces (45a, 46a) having interface addresses and a distributed forwarding engine structure where every device board (10, 11a, 12a) associated with the handling of IP-traffic is provided with a forwarding engine (20-22). Each board internal IP-subnet (45, 46) is associated with at least one predetermined node resource (40-43) for processing telecommunications traffic, thereby enabling a resource manager (49) to perform load distribution by ordering a destination address for a selected stream of IP-traffic, which is to terminate in the node, to be based on the interface address associated with a selected board internal IP-subnet (45, 46).

20 Claims, 3 Drawing Sheets

U.S. PATENT DOCUMENTS

| | | | |
|---|---|---|---|
| 5,802,278 A | 9/1998 | Isfeld et al. | |
| 5,905,723 A * | 5/1999 | Varghese et al. | 370/351 |
| 5,983,281 A | 11/1999 | Ogle et al. | |
| 6,553,028 B1 * | 4/2003 | Tang et al. | 370/389 |
| 6,598,034 B1 * | 7/2003 | Kloth | 706/47 |
| 6,633,560 B1 * | 10/2003 | Albert et al. | 370/351 |
| 6,763,018 B1 * | 7/2004 | Puthiyandyil et al. | 370/352 |
| 6,807,175 B1 * | 10/2004 | Jennings et al. | 370/390 |
| 6,834,050 B1 * | 12/2004 | Madour et al. | 370/392 |
| 6,853,639 B1 * | 2/2005 | Watanuki et al. | 370/390 |
| 6,996,681 B1 * | 2/2006 | Autechaud | 711/141 |
| 7,075,930 B1 * | 7/2006 | Chen et al. | 370/392 |
| 2002/0099855 A1 * | 7/2002 | Bass et al. | 709/249 |

FOREIGN PATENT DOCUMENTS

| | | |
|---|---|---|
| JP | 10-150466 | 6/1998 |
| WO | 00/54467 | 9/2000 |

OTHER PUBLICATIONS

Article; "Configuring Logical Interfaces"; Cisco IOS Interface Configuration Guide, pp. 135-146.

* cited by examiner

METHOD AND APPARATUS FOR FORWARDING OF TELECOMMUNICATIONS TRAFFIC

This application is the U.S. national phase of international application PCT/SE00/02370 filed 29 Nov. 2000, which designated the U.S.

FIELD OF THE INVENTION

The present disclosure relates to telecommunications network nodes, such as IP-routers and Media Gateways in general and in particular to forwarding of telecommunications traffic within such nodes.

BACKGROUND

It is today desirable to interconnect different types of telecommunications networks and provide users situated in different types of networks with an opportunity to communicate over these networks, despite differences in communications technology at the user endpoints. This is possible by means of i.a. Media Gateways. A Media Gateway is a telecommunications node that is able to interpret between and interconnect two different types of telecommunications networks. The Media Gateway may for instance interconnect a packet-switched computer network based on IP (Internet Protocol) with PSTN, which is the traditional circuit-switched telephone network. Voice-over-IP is an example of a service that can allow a user in the computer network to communicate with a user in the PSTN. The Media Gateway packs voice traffic from PSTN into IP-packets and sends them on to the computer network and vice versa, unpacks IP-packets from the computer network and converts their payload into voice traffic that is sent on to PSTN.

IP, the Internet Protocol, is a widely used protocol today, much due to the rapid growth of the Internet for which the protocol originally was designed. IP makes use of so called IP-addresses that are used to send data packets to the correct destination. The IP-addressing scheme is hierarchical. An IP-address is a number made up of a number of bits. In the so-called version 4 of IP, the IP-address is a 32-bit number and in the so-called version 6 the IP-address is a 128-bit number. A number of the first bits in the IP-address is used as a network identifier and a number of the last bits is used as an interface identifier. The interface identifier may identify an interface of e.g. a host or a router. Two IP-hosts that are connected to the same network may for instance have interfaces associated with the IP-addresses 10.5.17.2 and 10.5.17.3 respectively. The addresses are written in the form of four numbers separated by dots. Each number represents an octet i.e. an 8-bit number in the IP-address. The example shows that the first three octets of the two host interface addresses are the same. This signifies that the hosts are connected to the same network, or subnet. The hosts are both connected to a subnet identified by the subnet address 10.5.17.0. This subnet is in turn one of many subnets in the higher level subnet identified by the address 10.5.0.0.

An IP-router is a node that connects two or more physical IP-networks with each other and forwards IP-traffic between the different networks. The IP-router forwards information based on an IP destination address contained in each IP data packet. The router keeps routing information in a routing table, which informs the router of where to send data packets marked with a particular destination address. In its simplest form an IP-router will merely forward packets based on its destination address. More complex IP-routers will in addition support more complex functions such as tunneling.

Tunneling is a technique in which virtual pipes are created in an IP-network. By means of tunneling, tunnels that emulate physical links are formed. Several IP-addresses are used in tunneling. Two different types of IP-addresses used in tunneling will be discussed herein. These types of IP-addresses are here called "inner" and "outer" IP-addresses. A router or a gateway will in a first stage route packets based on the outer IP-address. The outer IP-address is associated with an endpoint of the tunnel. At the endpoint of the tunnel a so-called tunnel termination is performed, which among other things involves unpacking the packets so that the outer IP-address is peeled off and an inner IP-address becomes visible, figuratively speaking. The inner IP-address is thus invisible for the router or the gateway until the tunnel is terminated. A second stage routing can then take place based on the now visible inner IP-address. It is possible to create many levels of tunnels so that several levels of outer and inner IP-addresses are created and further stages of routing can take place. Tunneling can be used to set up virtual private networks across wide-area networks (WANs). By using encryption in the tunnels a desired level of security can be achieved. It is further advantageous to use tunnels if many small packets are to be sent to the same destination. Several small packets can then be collected in a large packet with a common outer IP-address to make the routing more efficient.

An IP-router that supports tunneling must comprise functionality for tunnel termination. That is, it must comprise resources that provide the router with the ability to unpack data packets in order to retrieve the inner IP-addresses.

Information relating to IP-routers and tunneling can be found on the Cisco homepage http://www.cisco.com, for instance in the document found under the address http://www.cisco.com/univercd/cc/td/doc/product/software/ios120/12cqcr/inter c/iclogint.htm.

A way in which IP-routers and Media Gateways are implemented is by placing functionality on a number of printed circuit boards (PCBs) which are interconnected by means of a backplane, which for instance may include a switch such as a TDM-switch or a cell-switch. Some boards may be provided with external interfaces on which external telecommunications traffic enters into the node or exits from the node. It may be of interest for telecommunications traffic entering the node on a first external interface, situated on a first PCB, to exit the node on a second external interface, situated on a second PCB. The function that forwards the telecommunications traffic from the first PCB via the backplane to the second PCB is called a forwarding engine (FE). The forwarding engine makes use of a forwarding table that contains information, which helps the FE to forward different traffic streams to the right PCB and connected interface. In order to make forwarding more efficient and to increase scaleability it is today common to use so-called distributed forwarding engines. Distributed forwarding is described in the U.S. Pat. No. 5,509,123, wherein it is described that each network interface is provided with a forwarding engine. Each forwarding engine is capable of forwarding traffic independently of the other forwarding engines and each forwarding engine has its own forwarding table.

SUMMARY OF THE INVENTION

In a node such as a Media Gateway or an IP-router that e.g. supports tunneling it is desirable to terminate telecommunications traffic in the node. The traffic that should terminate in the node may for instance be IP-packets that should be terminated and transformed into PSTN-traffic in the case of a Media Gateway or traffic that has been tunneled and the tunnel is to terminate in the present node in the case of an IP-router. Common for the traffic that is to terminate in the node is that it should be processed in some way, which requires work from resources in the node. The type of resources needed depends on the type of traffic to be processed and how it is desirable to process it. The resources in the node will have a limited capacity and it is therefore of interest to utilize this capacity as efficiently as possible. Thus load distribution is often used within a node in order to distribute the load that the terminating traffic represents in a preferred way between the available resources. One or more disclosed embodiments solve the problem of how to provide simple and effective means and a simple and effective method for load distribution within a node that is able to handle IP-traffic. A node that is able to handle IP-traffic may for instance be an IP-router, a Media Gateway that is connected to an IP-network or a node that is a combined IP-router and Media Gateway.

An object of the disclosed embodiments is to provide a telecommunications node that is able to handle IP-traffic and to terminate telecommunications traffic, which node includes means for simple and effective load distribution between resources in the node.

Another object of the disclosed embodiments is to provide a method for simple and effective load distribution between resources in a telecommunications node, which is able to handle IP-traffic and to terminate telecommunications traffic.

One or more disclosed embodiments solve the above stated problem by means of a telecommunications node and by means of a method for load distribution as stated in claim 10.

According to a first aspect of the disclosed embodiments, the problem mentioned above is solved by introducing, in the telecommunications node, board internal IP-subnets with associated interface addresses and a distributed forwarding engine structure where every device board associated with the handling of IP-traffic is provided with a forwarding engine, irrespective of the presence of an external interface on such a device board.

According to one aspect of the disclosed embodiments the above stated problem is solved by a telecommunications node, which is able to handle IP-traffic and to terminate telecommunications traffic, and which includes a backplane, which is able to switch IP-packets, and at least two device boards, connected to the backplane. The telecommunications node further includes a distributed forwarding engine structure wherein each board that is associated with the handling of IP-traffic is provided with a forwarding engine, irrespective of the presence of an external interface on the device board. At least one board is further provided with at least one board internal IP-subnet, associated with at least one interface address. Each board internal IP-subnet is associated with at least one predetermined node resource for processing telecommunications traffic, thereby enabling a resource manager to perform load distribution by ordering a destination address for a selected stream of telecommunications traffic, which is to terminate in the node, to be based on the interface address associated with a selected board internal IP-subnet.

According to another aspect of the invention the above stated problem is solved by means of a method for load distribution between resources in a telecommunications node that is able to handle IP-traffic and to terminate telecommunications traffic. Said method comprises the steps of a resource manager determining an appropriate set of resources for processing a stream of telecommunications traffic; the resource manager ordering a destination address for said stream of telecommunications traffic to be based on an interface address associated with a board internal IP-subnet, which subnet is associated with said appropriate set of resources; a first forwarding engine receiving at least one data packet associated with said stream of telecommunications traffic and forwarding said packets, via a backplane, based on the destination address to a second forwarding engine situated on the same device board as the board internal IP-subnet; and said second forwarding engine forwarding said at least one data packet to said interface associated with the IP-subnet for further forwarding to said appropriate set of resources.

An advantage with the disclosed embodiments is that a simple load distribution is provided, wherein IP-addresses can be used to distribute the load. Since the node already is suited to handle IP-traffic there is no need to introduce specific functionality or internal protocols for load distribution of IP-packets, and there is no need for the forwarding engines of the node to look into higher order protocols in order to perform the load distribution. Instead of simply using an IP-address for distribution of the IP-traffic to the node, the IP-address is, according to the invention, also used for load distribution within the node.

Another advantage of the disclosed embodiments is that a simple mechanism for load distribution that is easy to configure is provided.

Yet another advantage of the disclosed embodiments is that the embodiments are based on a structure in the telecommunications node that is flexible and capacity modular and thus scales easily.

An advantage of an embodiment of the present disclosure, wherein at least one board internal IP-host is introduced and associated with the at least one board internal IP subnet, is that the embodiment allows for a simple and clean implementation of the forwarding engines. The forwarding engines will forward all telecommunications traffic in the same way based on IP-destination addresses irrespective of whether the destination address is the host interface address of an internal IP-host or an external IP-host situated outside the node. The embodiment thus allows for load distribution without requiring any extra abilities from the forwarding engines than their normal ability to forward IP-packets based on an IP-destination address.

A further advantage of an embodiment of the present disclosure is that the load distribution allows for load distribution in several steps in the case of tunneling, thus making it possible for several resources to process the telecommunications traffic in steps, whereby a second dimension of load distribution can be obtained.

One or more principles of the invention will now be described in more detail by means of preferred embodiments and with reference to the accompanying drawings.

DETAILED DESCRIPTION

Figure 1:
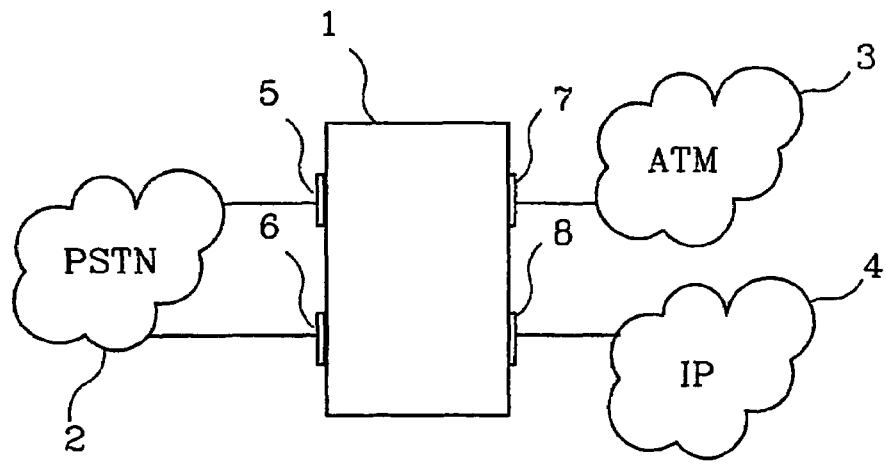
FIG. 1 is a schematic block diagram of a telecommunications node that interconnects a number of telecommunications networks.

As mentioned above the present disclosure provides simple and effective means for load distribution within a node that is able to handle IP-traffic. FIG. 1 shows such a telecommunications node 1, which in this example is a node that is a combined IP-router and Media Gateway. The node interconnects three networks, namely a PSTN-network 2, an ATM-network 3 and an IP-network 4. The node 1 is connected to the networks 2-4 via interfaces 5-8. FIG. 1 shows two interfaces 5,6 through which the node is connected to the PSTN-network 2, one interface 7 through which the node is connected to the ATM-network 3 and one interface 8 through which the node is connected to the IP-network 4. Only a few interfaces are shown in FIG. 1 for simplicity, but the number of interfaces connected to a network can in reality be very large. It can also be appreciated that the number and types of networks that the node interconnects may vary.

Figure 2:
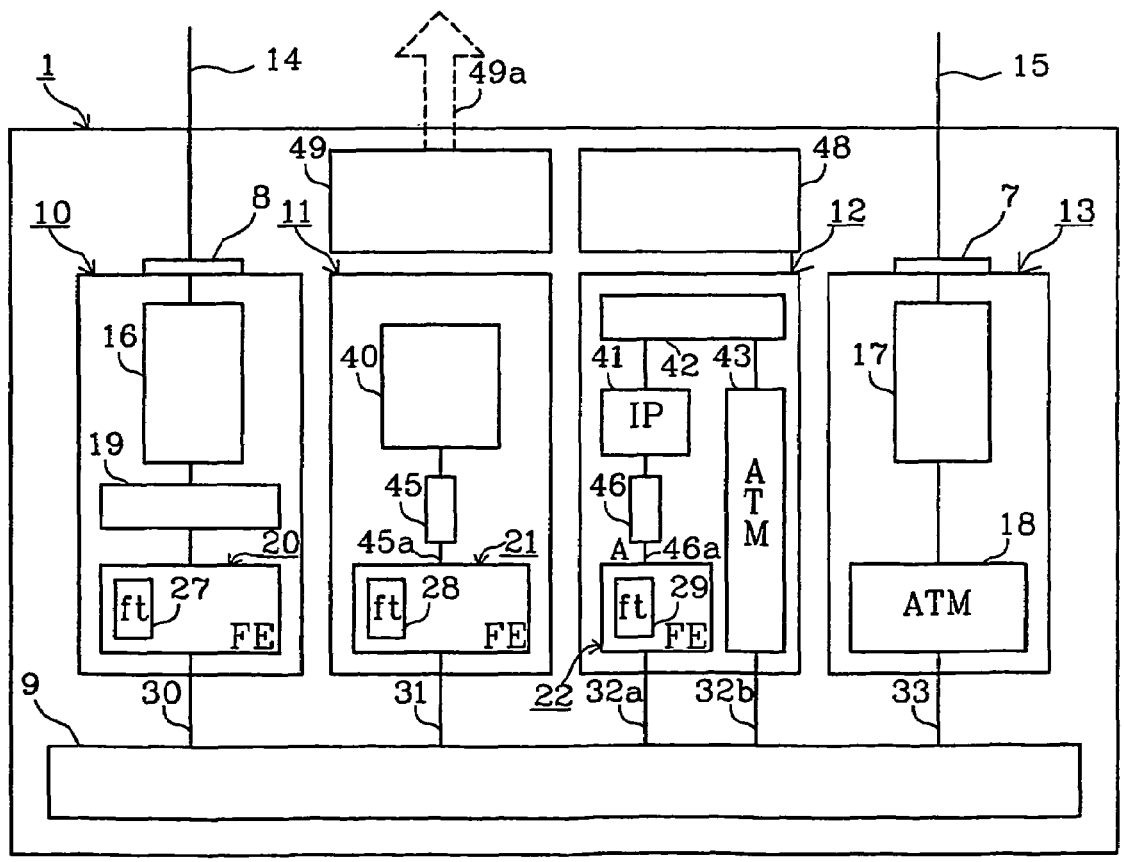
FIG. 2 is a schematic block diagram of a first embodiment of a telecommunications node according to the present invention.

FIG. 2 is a logic schematic block diagram of the node 1 according to the invention. The node 1 includes a backplane 9 that provides a full mesh interconnection between device boards of the node. A number of the node's device boards 10-13 are shown in FIG. 2. The device boards are connected to the backplane via internal interfaces 30, 31, 32a, 32b, 33. Two of the device boards 10, 13 shown have external interfaces 8, 7 through which the node is connected by external lines 14, 15 to the networks 3, 4 as shown in FIG. 1. The external lines 14, 15 are terminated on the device boards 10, 13 in line termination devices 16, 17 respectively. The device board 13 further includes an ATM-switching function 18, which is able to provide incoming and outgoing ATM-traffic with Virtual Connection Identifiers (VCI) that are suitable for forwarding ATM-traffic internally, within the node, or externally.

The board 10 further includes a link layer termination device 19 and a forwarding engine (FE) 20. The internal interface 30 is associated with the forwarding engine 20. The task of the forwarding engine 20 is simply to forward IP-traffic to other internal interfaces 31,32a or external interfaces 7,8 based on information contained in a forwarding table 27. All device boards that handle IP-traffic can be provided with a forwarding engine, which in this example means that the device board 11 is provided with a forwarding engine 21, with an associated forwarding table 28, and the device board 12 is provided with a forwarding engine 22, with an associated forwarding table 29. The forwarding engine 21 is associated with the internal interface 31 and the forwarding engine 22 is associated with the internal interface 32a. The device board 13 is not provided with a forwarding engine since the board only handles ATM-traffic.

The device boards 11 and 12 have no external interfaces. They are boards that each includes resources for processing telecommunications traffic. These resources have a limited capacity. Even though FIG. 2 only shows two boards, such as the device boards 10 and 11, that include said resources, it is to be understood that the node 1 generally includes a large number of such boards including resources. Since the capacity of the resources is limited as mentioned, it is of interest to distribute traffic, i.e. load, between the resources so as to utilize the available capacity of the resources efficiently. The resource or resources of the device board 11 is indicated as a general resource device 40, which for instance includes a protocol termination, a cross-connect function, a transcoder or some other type of processing resource. The resources of the device board 12 include inter alia an IP-termination device 41, a cross-connect device 42 and an ATM-termination device 43.

The boards 11 and 12 can also include board internal IP-subnets 45,46, associated with the resources of the device boards 11, 12 respectively. The IP subnets are associated with interfaces 45a and 46a respectively, which in the following will be called subnet interfaces. Each of the subnet interfaces 45a, 46a has an IP-address, which can be used for addressing and forwarding of traffic to the resources on the board of the IP-subnet.

The forwarding tables contain routing information regarding how the associated forwarding engine should transmit IP-packets on its internal interface or interfaces. The forwarding engines in FIG. 2 are all shown with only one internal interface leading to the backplane 9, but it is also possible for a forwarding engine to have more than one such interface. The routing information in the forwarding table tells the forwarding engine to which interface it should forward packets marked with a particular destination address.

A routing table manager 48 determines the contents of the forwarding tables 27-29. If it is desirable to change how a forwarding engine forwards packets the routing table manager provides the forwarding engines with updated forwarding tables. This process is well known to a person skilled in the art and will thus not be explained further herein.

In addition to the objects described above the node 1 further includes a resource manager 49. The function of the resource manager will be explained below.

The load distribution will now be explained in greater detail by means of an example and with reference to FIG. 1 and FIG. 2. Assume that a connection is to be set up between the IP-network 4 and the ATM-network 3 via the node 1 in order to send a stream of telecommunications traffic from the IP-network to the ATM-network and vice versa. It will, by signaling, be decided in a set-up phase what resources in the node that is to be used to set up the requested connection. This set-up phase involves the resource manager 49. The resource manager 49 is able to communicate with telecommunications devices located in the networks 2-4 via at least one signaling channel 49a. The resource manager 49 has knowledge regarding the resources in the node. Such knowledge may include knowledge relating to the existence of the resource, the capacity of the resource, the current load of the resource etc. Based on this knowledge the resource manager determines a suitable set of resources to be used for the requested connection. It is for the current connection among other things necessary to use resources to convert IP-packets into ATM-cells. The resource manager knows that the resources 41-43 of the device board 12 are capable of performing this conversion and we assume in this example that the resource manager finds it suitable to place the load arising from the connection on these particular resources 41-43, rather than on some other resources of the same type on some other device board. The resource manager knows that the IP-subnet 46 is associated with the resources 41-43 of the device board 12 and thus orders the IP-address A of the subnet interface 46a to be used as destination address for the IP-packets of the current connection, which should be sent from the IP-network 4 to the ATM-network 3. The order is sent to the telecommunications device in the IP-network 4 that assembles the IP-packets and provides them with a destination address.

Only the parts of the set-up phase that is of interest for explanation purposes has been described above and this description is in addition much simplified. How a connection is set up between two networks via a Media Gateway is however well known to a person skilled in the art and a person skilled in the art is able to understand what steps have been overlooked or generalized in order to provide a simple and clear explanation of the present invention.

The IP-packets of the current connection will enter the node on the external line 14 that is terminated in line termination device 16. After link layer termination in the link layer termination device 19 the IP-packets will reach the forwarding engine 20. The forwarding engine 20 will simply have to look at the IP-destination address A of the IP-packets in order to be able to determine, by means of the forwarding table 27, to which interface 32*a* the IP-packets are to be forwarded initially. The packets are forwarded via the backplane and the internal interface 32*a* to the forwarding engine 22 of the board 12. The forwarding engine 22 finds, in its forwarding table 29, that the destination address A of the IP-packets means that the packets should be forwarded to the subnet interface 46*a*, which is an interface directly connected to the forwarding engine 22. The IP-packets will then via the IP-subnet 46 end up in the IP-termination device 41, which together with the cross-connect device 42 and the ATM-termination device 43 transforms the IP-packets into ATM-cells. The ATM-cells are then switched via the backplane to the ATM switching function 18, which then forwards the ATM-cells via the line termination device 17 and the external line 15 to the ATM-network 3.

The transformation of IP-packets into ATM-cells described above will also include intermediate steps not discussed herein but which are well known to a person skilled in the art. Such intermediate steps will e.g. involve protocols for channel identification. The IP-termination device 41, the cross-connect device 42 and the ATM-termination device 43 includes functions for protocol processing, which are not explained in detail herein but which are known to a person skilled in the art.

As is apparent from the example described above load distribution is obtained by the resource manager 49 determining that an IP-address A of a subnet interface 46*a* associated with a board internal IP-subnet 46 should be used as destination address for IP-packets of the connection. The resource manager 49 can thus distribute the load arising from a number of different connections between different device boards in the node by ordering different subnet interface addresses to be used as destination node for the IP-packets of different connections. The IP-packets can be routed directly to a suitable resource based on the destination address that was originally included in the IP-packet. The forwarding engines will thus not be involved in the load distribution in any other way than its normal forwarding of packets to different interfaces based on IP-address information contained in the IP-packets.

The embodiment described above, with reference to FIG. 2, includes board internal IP-subnets that differ from what commonly is meant with the concept IP subnet in that the board internal IP-subnets in FIG. 2 have no connection to an IP-host. This conceptual difference makes it necessary for the forwarding engines 20-22 of the node 1 to be aware of the special function of the subnet interface associated with the a board internal IP-subnet as compared with a normal interface of an external IP-subnet. The forwarding engine will thus know that IP-traffic that is destined to the subnet interface 45*a*, 46*a* of the board internal IP-subnet 45,46 is to be terminated in the node, in the particular resources associated with the IP-subnet, according to the rules that govern internal termination.

The embodiment of the present invention described above, with reference to FIG. 2, includes board internal IP-subnets that differ from what commonly is meant with the concept IP-subnet in that the board internal IP-subnets in FIG. 2 have no connection to an IP-host. This conceptual difference makes it necessary for the forwarding engines 20-22 of the node 1 to be aware of the special function of the subnet interface associated with the a board internal IP-subnet as compared with a normal interface of an external IP-subnet. The forwarding engine will thus know that IP-traffic that is destined to the subnet interface 45*a*, 46*a* of the board internal IP-subnet 45, 46 is to be terminated in the node, in the particular resources associated with the IP-subnet, according to the rules that govern internal termination.

Figure 3:
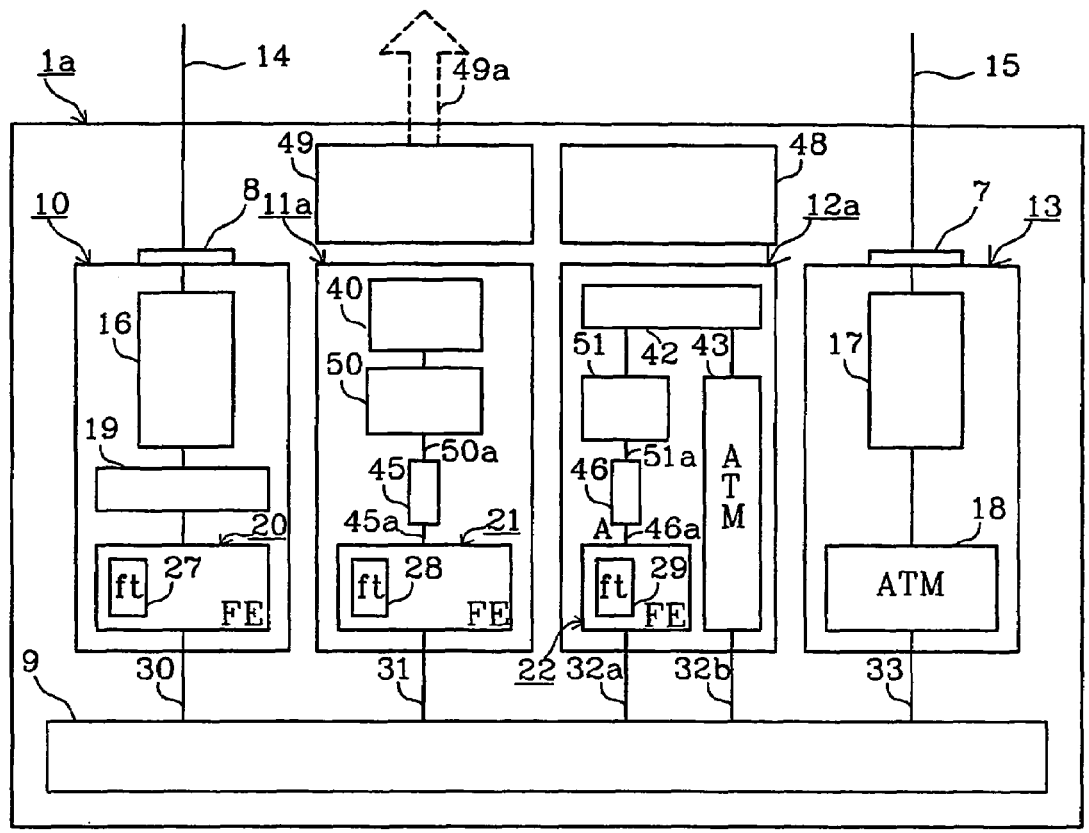
FIG. 3 is a schematic block diagram of a second embodiment of a telecommunications node according to the present invention.

A conceptually purer implementation of the forwarding engines could be obtained if the forwarding engines simply could forward IP-traffic based on the IP-destination address and did not have to keep track of whether the destination address was an internal IP-address for load distribution or a normal external IP-address. Such a pure implementation of the forwarding engines can be obtained if, in addition to the board internal IP-subnets 45, 46 that was introduced, board internal IP-hosts are introduced. A node 1*a*, including board internal IP hosts, is shown in FIG. 3. The node 1*a* is similar to the node 1 in FIG. 2, where like reference numerals are used to denote corresponding features in the nodes. Features, which have been explained with reference to FIG. 2, will not be further explained with reference to FIG. 3. Two boards 11*a* and 12*a* of node 1*a* are shown that include board internal IP hosts 50 and 51 respectively, which conform to standard IP hosts in any aspect that is visible from the IP-network side. The IP-hosts 50,51 are associated with interfaces 50*a*, 51*a*, which hereinafter will be called host interfaces. The host interfaces 50*a*, 51*a* each have an associated IP address, here called host address. The host address may be used as destination address instead of the address of the subnet interface 45*a*, 46*a* of the board internal IP-subnet 45,46. The hosts include functionality for IP-termination. The forwarding engines 20-22 sees no conceptual difference between a normal external IP-subnet and the board internal IP-subnet 45,46 that has the IP-host 50,51 connected to it. Thus the forwarding engines can be implemented to forward IP-packets, based on the destination address, in the same way, irrespective of whether the destination address is the host address associated with a board internal IP-host or with an IP-host located outside the node 1*a*. This provides for a conceptually pure implementation of the forwarding engines 20-22.

As mentioned above an advantage with the node that includes board internal IP-hosts is that it provides for a more conceptually pure implementation of the forwarding engine. There are however also arguments in favor of the embodiment with "dummy subnets", i.e. the embodiment with board internal IP-subnets that are not associated with board internal IP-hosts. Many IP-addresses are required in a node with board internal IP-subnets and IP-hosts. IP-hosts further require fairly complicated arrangements for maintenance, which can be avoided for the embodiment with dummy subnets.

The forwarding engines described above were all depicted as having a single interface each towards the backplane. However, it is possible to provide a forwarding engine with more than one interface. It is possible, for a forwarding engine that has more than one interface, to create forwarding engine instances by means of configuring a subset of the interfaces to be associated with one instance, another subset to be associated with another instance etc. The forwarding engine instance performs IP-forwarding from its own separate forwarding table, independently of other forwarding engines or forwarding engine instances. Since each instance is provided with its own forwarding table it is possible to use overlapping address spaces for two instances located on the same board. Since there is a limited number of IP-addresses available it is advantageous if the same IP-address can be used for more than one purpose, as provided for by the forwarding engine instantiation. Instantiation provides an excellent mechanism for tunneling and for creating logical routers within a node, thereby supporting Virtual Private Networks. The merits of instantiation will be further explained with reference to FIG. 4.

Figure 4:
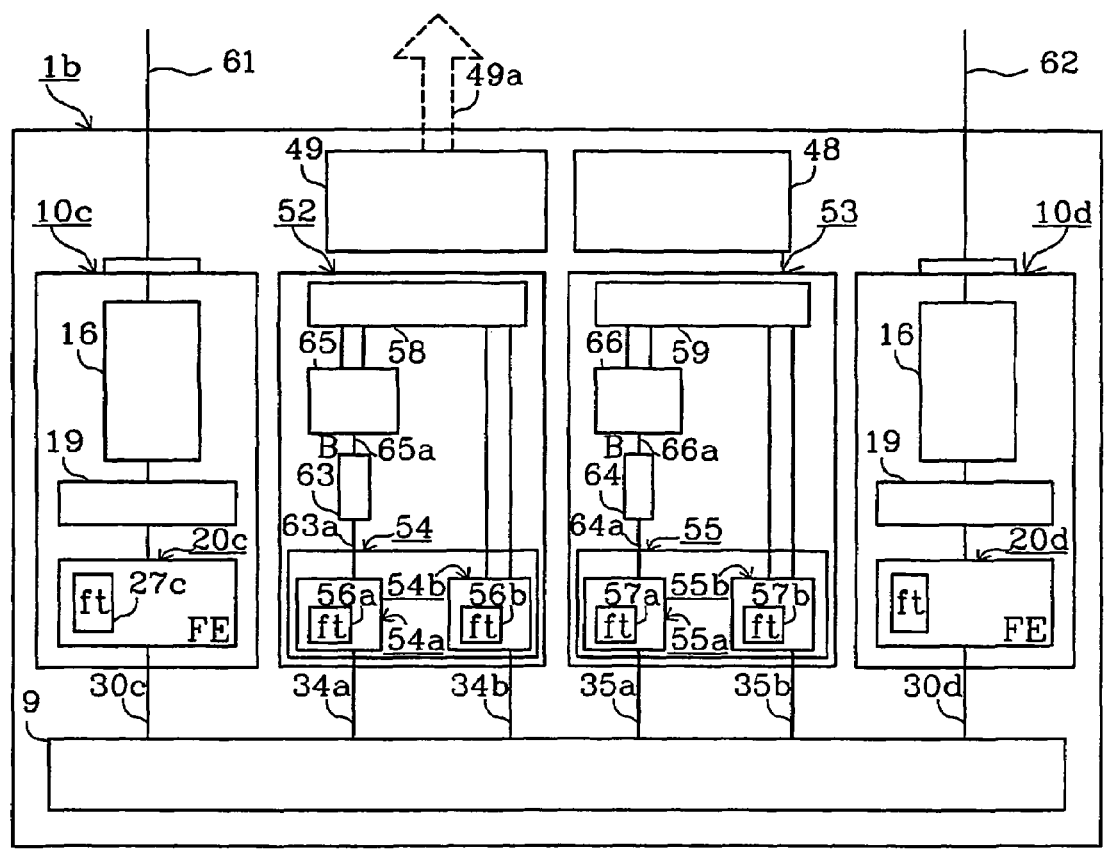
FIG. 4 is a schematic block diagram of a third embodiment of a telecommunications node according to the present invention.

FIG. 4 shows an embodiment of a telecommunications node 1b according to the present invention. The node 1b is in many aspects similar to the node 1 in FIG. 2 and the node 1a in FIG. 3, where like reference numerals are used to denote corresponding features in the nodes. Features, which have been explained with reference to FIGS. 2 and 3, will not be further explained with reference to FIG. 4.

The node 1b is an IP-router that supports tunneling. Two device boards 10c and 10d are shown, which include resources 16, 19 for terminating external lines 61, 62 connected to IP-networks. The device boards 10c and 10d also include a forwarding engine 20c, 20d each. Two device boards 52 and 53 are shown, which include tunnel termination devices 58 and 59. These boards 52, 53 are provided with first interfaces 34a and 35a and second interfaces 34b and 35b, to the backplane. All device boards that handle IP are provided with a forwarding engine, which means that the boards 52, 53 also are provided with forwarding engines 54 and 55. These forwarding engines are instantiated. The forwarding engine 54 has a first instance 54a, associated with the first interface 34a, and a second instance 54b, associated with the second interface 34b. The forwarding engine 55 has a first instance 55a, associated with the first interface 35a, and a second instance 55b, associated with the second interface 35b. The instances forward IP-packets independently of each other and they each have their own forwarding table 56a, 56b, 57a, 57b. The boards 52, 53 are provided with board internal IP-subnets 63 and 64 and board internal IP-hosts 65 and 66 for providing the load distribution to the tunnel termination devices 58 and 59. The IP-subnets 63, 64 are associated with subnet interfaces 63a, 64a respectively and the IP-hosts 65,66 are associated with host interfaces 65a, 66a respectively.

As mentioned above tunneling involves outer and inner IP addresses. The arrangement in the node 1b makes it possible to perform load distribution on both the outer and the inner IP-address. Assume that the resource manager 49 during set-up of a first tunnel to be terminated in the node 1b, determined that a host address B, which is the address of the host interface 65a and which thereby is associated with the board internal IP-host 65, should be used as outer IP-address in order to direct the tunnel termination to the tunnel termination device 58. An IP-packet belonging to the first tunnel will enter the node on external line 61, proceed to the forwarding engine 20c, which forwards them to the forwarding engine instance 54a. The forwarding engine instance 54a sees on the outer IP-address that the packets are destined to the IP-host 65, with which it is associated via IP-subnet 63 and forwards the packets to the IP-host 65, which in turn subsequently directs them to the tunnel termination device 58. After termination of the tunnel in the tunnel termination device 58 the inner IP-addresses of the connections carried in the first tunnel become visible to the forwarding engine instance 54b, which performs forwarding based on these inner IP-addresses. These inner IP-addresses may be IP-host addresses associated with external IP-hosts or, if a connection is to be further processed, the inner IP-address of packets belonging to the connection may be an interface address associated with a board internal IP-host or IP-subnet, so that a second stage of load distribution is performed within the node 1b. If for instance one of the connections carried in the first tunnel is a second tunnel, the IP-packets belonging to the second tunnel may be marked with the IP-host address associated with the IP-host 66, if it was determined by the resource manager 49 during set-up of the second tunnel that it is to be terminated in the tunnel termination device 59.

Due to the fact that each forwarding engine instance has its own forwarding table and that the inner IP-addresses of the first tunnel are invisible to the forwarding engine instance 54a, it is, with the tunneling arrangement described above, actually possible for the host interface 65a and the host interface 66a to have the same IP-host address B. This works by arranging so that a forwarding table 27c of the forwarding engine 20c contains information that packets destined to IP-host address B should be forwarded to interface 34a, associated with forwarding engine instance 54a. The forwarding table 56a of the forwarding engine instance 54a is arranged to contain information that packets destined to IP-host address B should be forwarded to the subnet interface 63a associated with the instance. The forwarding table 56b of the forwarding engine 54b is separate from the forwarding table 56a and is arranged to contain information that packets destined to IP-host address B should be forwarded to interface 35a, associated with forwarding engine instance 55a.

Figure 5:
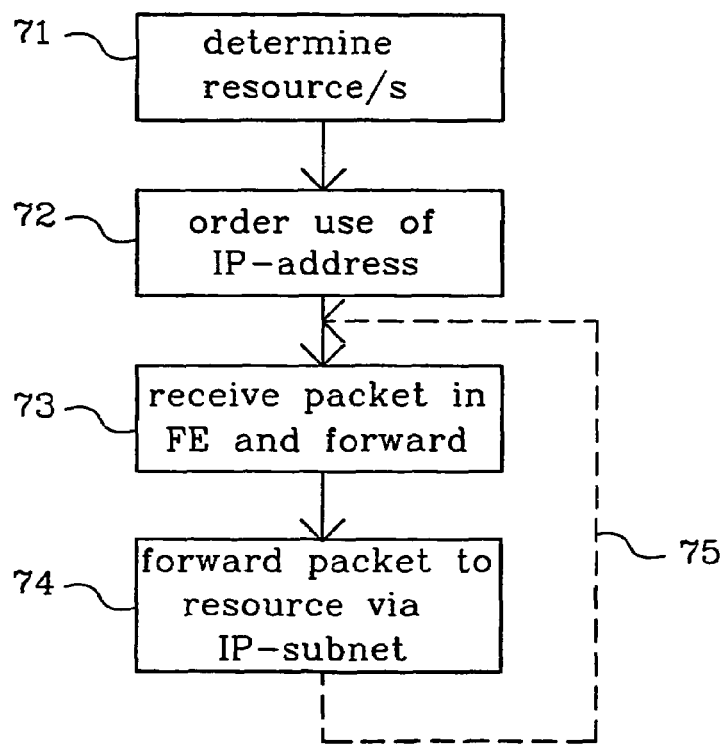
FIG. 5 is a flow diagram illustrating a method according to the present invention.

FIG. 5 shows a flow diagram of a method for load distribution in a telecommunications node. In a first step 71, a resource manager determines an appropriate set of resources of the node for processing a stream of telecommunications traffic. The resource manager then orders a destination address for said stream of telecommunications traffic to be based on an interface address associated with a board internal IP subnet, which subnet is associated with said appropriate set of resources, step 72. The interface address on which the destination address is based may either be the IP-address of a subnet interface or the IP-address of a host interface of a board internal IP-host associated with the board internal IP-subnet. Both of these IP-addresses are associated with the board internal IP-subnet and due to the way in which the IP-addressing scheme is built, as explained above, they have a common first address part which identifies the board internal IP-subnet. In a step 73, a first forwarding engine receives at least one data packet associated with said stream of telecommunications traffic and forwards said packets, via a backplane, based on the destination address, to a second forwarding engine situated on the same device board as the board internal IP-subnet. Said second forwarding engine forwards said at least one data packet to an interface of said IP-subnet for further forwarding to said appropriate set of resources, in step 74. In the case of tunnel termination and where the second forwarding engine is instantiated it is possible that a further stage of load distribution is performed, as described above. In that case, the resource manager will have determined suitable resources and destination addresses to be used in the different stages in step 71 and 72. After the packets have been processed in the resources determined by the resource manager for the first stage, the processed packets are received in an instance of the second forwarding engine, which performs suitable forwarding of the processed packets. This can be seen as the start of a further stage of load distribution and a repetition of step 73 and 74, as indicated by dashed line 75.

Board internal IP-subnets represent important principle of the disclosure. Different terms may in practice be used for what here is meant with an IP-subnet or equivalents thereof. The term IP-subnet is here intended to cover such other terms. With an IP-subnet is commonly meant something that "includes" a number of IP-interface addresses. The interface addresses of the subnet are associated with each other in such a way that nodes associated with the interface addresses can communicate with each other directly without an intermediate IP-router of some kind. The nodes can communicate directly in such a way that they can communicate on protocol levels lower than IP. Dummy subnets been discussed. The dummy subnet is a subnet, which unlike normal subnets, "includes" a single interface.

A telecommunications node provided with load distribution according to the one or more embodiments scale easily. Since the forwarding engine functionality is distributed it is easy to increase the capacity of the node by adding more device boards that for instance include additional forwarding engines, IP-subnets, IP-hosts or other resources for processing of telecommunications. The addition of one or more device boards may necessitate that at least one forwarding table is updated but this is a simple adjustment.

It is further easy to configure or reconfigure a telecommunications node according to the invention. It is for instance possible to make arrangements for changing the assignment of interfaces to forwarding engine instances located on the same board by means of a simple command to a forwarding engine software.

The invention claimed is:

1. A telecommunications node with an ability to handle IP-traffic and to terminate telecommunications traffic, the node comprising:
   a backplane, which is able to switch IP-packets;
   at least two device boards, which are connected to the backplane and are associated with the handling of IP-traffic;
   at least one resource for processing telecommunications traffic,
   a resource manager; and
   a distributed forwarding engine functionality,
   wherein the forwarding engine functionality is distributed such that each of said at least two device boards is provided with a forwarding engine,
   wherein at least a first device board of said at least two device boards is further provided with at least a first resource of the at least one resource and at least one board internal IP-subnet, having an associated IP subnet address and at least a first associated IP interface address,
   wherein the first associated IP interface address is based on said associated IP subnet address,
   wherein the board internal IP-subnet is associated with the at least one resource, and
   wherein the resource manager is arranged to perform a load distribution within the node by determining that a destination address of a first telecommunications traffic stream is to be based on the IP subnet address associated with the board internal IP-subnet.

2. The telecommunications node of claim 1,
   wherein the first device board further includes at least one board internal IP-host, associated with an IP host address,
   wherein the IP host address also is associated with the board internal IP-subnet and which is based on the IP subnet address, and
   wherein the board internal IP-host is associated with said board internal IP-subnet and said first resource.

3. The telecommunications node of claim 2, wherein the resource manager is arranged to determine that the destination address is to be based on the IP host address.

4. The telecommunications node of claim 2, wherein the board internal IP-host includes said first resource.

5. The telecommunications node of claim 1, wherein at least the forwarding engine of said first device board includes at least two forwarding engine instances.

6. The telecommunications node of claim 5, wherein the first resource is a tunnel termination device, with an input and an output, which input is associated with a first forwarding engine instance of said at least two forwarding engine instances, and which output is associated with a second forwarding engine instance of said at least two forwarding engine instances.

7. The telecommunications node of claim 1, wherein the node is a Media Gateway.

8. The telecommunications node of claim 1, wherein the node is an IP-router.

9. The telecommunications node of claim 1, wherein the node is a combined Media Gateway and IP-router.

10. The telecommunications node of claim 1, wherein the resource manager is arranged to perform the load distribution by communicating with an external network to specify the IP subnet address as the destination address for the first telecommunications traffic stream.

11. A method for distributing load within a telecommunications node, wherein the node is able to handle IP-traffic and to terminate telecommunications traffic and wherein the node includes a backplane, which is able to switch IP-packets, and at least two device boards, connected to the backplane, said method comprising:
   a resource manager of the node determining at least a first resource of the node to be appropriate for processing a first stream of telecommunications traffic;
   the resource manager ordering a destination address of said first stream of telecommunications traffic to be based on a first IP subnet address associated with at least one first board internal IP-subnet, which is located on a first device board of the at least two device boards and which is associated with the first resource;
   a first forwarding engine located on a second device board of the at least two device boards receiving at least one IP-packet associated with the first stream of telecommunications traffic and forwarding the at least one IP-packet, via the backplane, based on the destination address, to a second forwarding engine located on the first device board; and
   the second forwarding engine forwarding the at least one IP-packet to the first IP-subnet for further forwarding to the first resource.

12. The method of claim 11,
   wherein the first device board further includes a board internal IP-host, associated with a IP host address, wherein the IP host address also is associated with the board internal IP-subnet and which is based on the IP subnet address, and wherein the at least one IP-packet is forwarded to the first resource via the board internal IP-host.

13. The method of claim 12, wherein the resource manager orders the destination address to be based on the IP host address.

14. The method of claim 12, wherein the board internal IP-host includes the first resource.

15. The method of claim 12, wherein the second forwarding engine includes at least a first and a second forwarding engine instance, and wherein the first forwarding engine forwards the at least one IP-packet to the first forwarding engine instance of the second forwarding engine.

16. The method of claim 15, wherein the first resource is a tunnel termination device, with an input and an output, and wherein the first forwarding engine instance forwards the at least one IP-packet to the input of the tunnel termination device.

17. The method of claim 16 wherein the first stream of telecommunications traffic is a tunnel and wherein the method further comprises:

the resource manager determining a second resource of the node to be appropriate for processing a second stream of telecommunications traffic included in the tunnel;

the resource manager ordering a second destination address of the second stream of telecommunications traffic to be based on a second IP subnet address associated with a second board internal IP-subnet, which is associated with the second resource;

the tunnel termination device processing said at least one IP-packet and outputting to the second forwarding engine instance at least one second IP-packet associated with the second stream of telecommunications traffic; and the second forwarding engine instance forwarding the at least one second IP-packet, via the backplane, based on the second destination address, to a third forwarding engine, located on the same device board as the second resource; and the third forwarding engine forwarding the at least one second IP-packet to the second IP-subnet for further forwarding to the second resource.

18. The method of claim 11, wherein the resource manager orders to an external network that the destination address of said first stream of telecommunications to be the first IP subnet address.

19. A telecommunications node, comprising:

a plurality of device boards, including a first and second device boards, operatively connected to each other via a backplane, wherein the first and second device boards are configured to handle IP traffic; and a resource manager configured to manage resources of the node to distribute load across the plurality of device boards, wherein the resource manager is configured to determine that for a particular IP traffic type, a resource on the second device board is currently better suited to handle the particular IP traffic type, wherein the resource manager is configured to communicate with one or more networks external to the node to notify the one or more external networks that IP data of the particular IP traffic type is to have a destination IP address corresponding to a subnet IP address corresponding to the resource on the second device, and wherein the first device board is configured to receive IP data from the one or more external networks, the first device board including a forwarding engine configured to forward the IP data based on the destination IP address of the IP data.

20. The telecommunications node of claim 19, wherein the forwarding engine of the first device board is configured to forward the IP data based solely on the destination IP address of the IP data.

* * * * *

UNITED STATES PATENT AND TRADEMARK OFFICE
CERTIFICATE OF CORRECTION

PATENT NO. : 7,369,562 B2
APPLICATION NO. : 10/433122
DATED : May 6, 2008
INVENTOR(S) : Johansson et al.

Page 1 of 1

It is certified that error appears in the above-identified patent and that said Letters Patent is hereby corrected as shown below:

In Column 2, Line 37, delete "ios120/12cqcr" and insert -- ios120/12cgcr --, therefor.

In Column 7, between Lines 59 & 60, insert paragraph -- The embodiment of the node according to the present invention described above includes several device boards and a backplane, which interconnects the device boards. The terms "device board" and "backplane" should here be interpreted broadly. A device board will in most cases be a printed circuit board (PCB) on which a number of devices are fitted, but the term device board is here intended to also cover other physical realizations, such as a group of devices electrically connected by a cable instead of by a printed circuit board. The backplane in Fig. 2 is schematically shown as a physical entity separate from the device boards. In reality some of the functionality of the backplane is usually hosted on the device boards 10-13, as well as on device boards dedicated for backplane functionality. The term backplane is here intended to cover a mechanism that provides all-to-all interconnection to the device boards 10-14. The term backplane is thus, in addition to the more traditional implementation described above, intended to cover untraditional realizations, such as a backplane that includes a local network that interconnects distributed device boards. --.

In Column 7, Line 67, delete "the" before "a".

In Column 8, Lines 7-22, delete "The embodiment of the present......................that govern internal termination.".

Signed and Sealed this

Third Day of March, 2009

JOHN DOLL
*Acting Director of the United States Patent and Trademark Office*